(12) United States Patent  (10) Patent No.: US 7,920,706 B2
Asokan et al. (45) Date of Patent: Apr. 5, 2011

(54) METHOD AND SYSTEM FOR MANAGING CRYPTOGRAPHIC KEYS

(75) Inventors: Nadarajah Asokan, Espoo (FI); Niemi Valtteri, Helsinki (FI)

(73) Assignee: Nokia Corporation, Espoo (FI)

( * ) Notice: Subject to any disclaimer, the term of this patent is extended or adjusted under 35 U.S.C. 154(b) by 748 days.

(21) Appl. No.: 10/696,495

(22) Filed: Oct. 28, 2003

(65) Prior Publication Data

US 2004/0146163 A1 Jul. 29, 2004

(30) Foreign Application Priority Data

Oct. 28, 2002 (WO) .................. PCT/IB02/04450

(51) Int. Cl.
*H04L 9/00* (2006.01)
(52) U.S. Cl. ............ 380/277; 380/30; 380/44; 380/201; 380/247; 380/255; 380/259; 380/260; 380/264; 380/270; 380/273; 380/278; 380/279; 380/280; 380/281; 380/282; 380/283; 380/284; 380/285; 380/286; 713/150; 713/155; 713/156; 713/157; 713/164; 713/168; 713/169; 713/170; 713/171; 713/175; 713/194; 726/2; 726/4; 726/10; 726/20; 726/21; 726/26
(58) Field of Classification Search .......... 380/277–286, 380/270, 44, 201, 247, 30, 255, 259–260, 380/264, 273, 26; 713/164, 155–157, 194, 713/150, 175, 168–171; 726/4, 10, 20–21, 726/26–2
See application file for complete search history.

(56) References Cited

U.S. PATENT DOCUMENTS

| | | | | |
|---|---|---|---|---|
| 5,265,164 | A * | 11/1993 | Matyas et al. | 380/30 |
| 5,564,032 | A * | 10/1996 | Aota et al. | 711/103 |
| 5,768,389 | A * | 6/1998 | Ishii | 380/30 |
| 5,799,080 | A * | 8/1998 | Padmanabhan et al. | 713/193 |
| 5,887,253 | A * | 3/1999 | O'Neil et al. | 455/418 |
| 5,892,900 | A | 4/1999 | Ginter et al. | |
| 5,983,117 | A * | 11/1999 | Sandler et al. | 455/557 |
| 6,112,305 | A * | 8/2000 | Dancs et al. | 713/156 |
| 6,292,569 | B1 * | 9/2001 | Shear et al. | 380/255 |
| 6,560,581 | B1 * | 5/2003 | Fox et al. | 705/51 |
| 6,571,339 | B1 * | 5/2003 | Danneels et al. | 726/9 |
| 6,574,733 | B1 * | 6/2003 | Langford | 713/194 |

(Continued)

FOREIGN PATENT DOCUMENTS

EP 0950968 A1 * 8/1998

(Continued)

*Primary Examiner* — Edan Orgad
*Assistant Examiner* — Canh Le
(74) *Attorney, Agent, or Firm* — Alfred A. Fressola; Ware, Fressola, Van Der Sluys & Adolphson LLP

(57) ABSTRACT

A key management of cryptographic keys has a data package including one or more cryptographic keys that are transferred to a personal device 100 from a secure processing point 150 of a device assembly line in order to store device specific cryptographic keys in the personal device 100. In response to the transferred data package, a backup data package is received by the secure processing point 150 from the personal device 100, which backup data package is the data package encrypted with a unique secret chip key stored in a tamper-resistant secret storage 125 of a chip 110 included in the personal device 100. The secure processing point 150 is arranged to store the backup data package, together with an associated unique chip identifier read from the personal device 100, in a permanent, public database 170.

22 Claims, 2 Drawing Sheets

U.S. PATENT DOCUMENTS

| | | | |
|---|---|---|---|
| 6,775,770 B1 * | 8/2004 | Davis et al. | 713/156 |
| 6,816,844 B2 * | 11/2004 | Leon | 705/401 |
| 6,978,022 B2 * | 12/2005 | Okimoto et al. | 380/211 |
| 6,986,053 B1 * | 1/2006 | Schwartz et al. | 713/193 |
| 6,987,853 B2 * | 1/2006 | Uner | 380/44 |
| 7,005,733 B2 * | 2/2006 | Kommerling et al. | 257/679 |
| 7,187,919 B2 * | 3/2007 | Fukuzato | 455/410 |
| 7,551,913 B1 * | 6/2009 | Chien | 455/411 |
| 2002/0013898 A1 * | 1/2002 | Sudia et al. | 713/155 |
| 2002/0023214 A1 * | 2/2002 | Shear et al. | 713/170 |
| 2002/0083318 A1 | 6/2002 | Larose | |
| 2002/0104006 A1 * | 8/2002 | Boate et al. | 713/186 |
| 2002/0107798 A1 | 8/2002 | Hameau et al. | |
| 2002/0114470 A1 | 8/2002 | Mauro, II et al. | |
| 2002/0141575 A1 | 10/2002 | Hird | |
| 2002/0147920 A1 * | 10/2002 | Mauro | 713/200 |
| 2002/0150243 A1 | 10/2002 | Craft et al. | |
| 2002/0152173 A1 * | 10/2002 | Rudd | 705/57 |
| 2002/0157002 A1 | 10/2002 | Messerges et al. | |
| 2002/0178354 A1 * | 11/2002 | Ogg et al. | 713/155 |
| 2003/0041239 A1 * | 2/2003 | Shear et al. | 713/156 |
| 2003/0076957 A1 * | 4/2003 | Asokan et al. | 380/270 |
| 2003/0086571 A1 * | 5/2003 | Audebert et al. | 380/277 |
| 2003/0159044 A1 * | 8/2003 | Doyle et al. | 713/176 |
| 2004/0022390 A1 * | 2/2004 | McDonald et al. | 380/277 |
| 2004/0103238 A1 * | 5/2004 | Avraham et al. | 711/102 |
| 2004/0151318 A1 * | 8/2004 | Duncanson, Jr. | 380/277 |
| 2004/0268124 A1 * | 12/2004 | Narayanan | 713/164 |
| 2005/0071664 A1 * | 3/2005 | de Jong | 713/200 |
| 2005/0091524 A1 * | 4/2005 | Abe et al. | 713/200 |

FOREIGN PATENT DOCUMENTS

| | | |
|---|---|---|
| JP | 2000/331420 | 11/2000 |
| JP | 2001/103045 | 4/2001 |
| JP | 2002/291043 | 10/2002 |
| WO | 01/73539 | 10/2001 |
| WO | WO 02/03271 | 1/2002 |
| WO | WO 02/11357 | 2/2002 |
| WO | WO 02/43016 | 5/2002 |
| WO | WO 02/076127 | 9/2002 |

* cited by examiner

METHOD AND SYSTEM FOR MANAGING CRYPTOGRAPHIC KEYS

CROSS REFERENCE TO RELATED APPLICATIONS

This application claims priority under 35 USC §119 to International Patent Application No. PCT/IB02/04450 filed on Oct. 28, 2002.

TECHNICAL FIELD OF THE INVENTION

The present invention relates to key management of cryptographic keys, which keys are intended to be used by applications included in a personal device.

TECHNICAL BACKGROUND AND PRIOR ART

The use of personal devices, such as cellular telephones and hand-held PDA:s (Personal Digital Assistant), is becoming increasingly popular. Other kinds of personal devices, including any mobile communication terminal having a terminal identity which somehow is associated with an end user identity, or in possession of an anonymous user, are easily conceivable. Among the end users of the personal devices and the parties communicating with these devices there is a need to be able to use encrypted communication, digital signatures and digital certificates. With these kinds of cryptographic techniques it is possible to ensure secrecy and integrity of communicated information data, authenticate an originator of information, as well as authenticating an intended recipient of information.

Encrypted communication between two entities is typically based on either shared secret keys or on public/private key pairs. To implement key-based encrypted communication and/or the use of digital signatures, schemes are needed to determine how and where the required keys should be generated, and also how to distribute the generated keys to the involved entities. A more general term which includes issues regarding generation, storage and distribution of keys, and which also is used in this document, is key management.

Secret keys obviously have to be managed and somehow be distributed among the participating entities. If a secret or private key should be transferred to an entity, it is important that this is performed in a secure way such that the key is not exposed to a third party, even if such a third party would do its utmost to get access to such a key. Public/private key pairs may be generated within an entity, requiring that only the public key needs to be distributed outside the entity. However, in case the public/private key pair is generated outside the specific entity, the private key needs to be transferred to the entity. Whenever a secret or private key is transferred it is also important to be able to ensure integrity of the key.

Future personal devices will include one or more device specific cryptographic keys. The number and types of these keys are dependent on the different applications included in the device, which applications will differ between different users and their respective usage of the device. Thus, it is difficult to foresee these numbers and types of keys that should be included in the device. For this reason it is necessary to be able to store a variety of keys in a storage area of the device when initializing the device. Typically, most of these keys will be stored in some non-robust memory, i.e. any memory in which information can be written and with the potential risk of losing any such information due to failure of the mechanism used for maintaining the information in the memory. As a consequence, in case of a failure of the device that results in loss of the originally stored keys, it is desired to be able to restore these original keys in a device. When transferring any secret or private keys for re-storage in the device, it is typically required, as discussed above, to maintain secrecy and integrity of the transferred keys.

U.S. Pat. No. 5,892,900, assigned to Intertrust, discloses, among other things, the use of cryptographic keys for providing security to cryptographic key management. The document describes a "Secure Processing Unit" (SPU) with a "Protected Processing Environment" (PPE) designed to perform processing tasks and to communicate with external entities in a secure manner. The PPE contains a key storage that is initialized with keys generated by the manufacturer and by the PPE itself. A manufacturing key that is public-key based or based on a shared secret is used as a so called master key for communicating other keys in a secure way. The manufacturing key is either hardwired into the PPE at manufacturing time, or sent to the PPE as its first key. The manufacturing key is used for protecting various other keys downloaded in the PPE, such as a public/private key pair and/or secret shared keys. Alternatively, the PPE has the capability of generating its own key pairs internally, in which case a manufacturing key may not be needed.

Disclosed in U.S. Pat. No. 5,892,900 is also the use of a download authorization key. The download authorization key is received by the PPE during an initialization download process. It is used to authorize PPE key updates and to protect a PPE external secure database backup to allow recovery by an administrator of the PPE if the PPE fails. The document also discloses the use of backup keys. A backup key is generated and stored within the PPE. A secure database external to the PPE stores backup records encrypted with the backup key. The backup key may be encrypted with the download authentication key and stored within the backup itself to permit an administrator to decrypt and recover the backup in case of PPE failure.

SUMMARY OF THE INVENTION

An object of the invention is to provide a method and a system for managing, with reduced overhead, cryptographic keys that are specific to a personal device.

Another object of the present invention is to provide a technique for management of device specific cryptographic keys which is simpler and with improved security in comparison with the teaching of U.S. Pat. No. 5,892,900 for such management.

According to the invention a data package including one or more cryptographic keys is transferred to a personal device from a secure processing point of a device assembly line in order to store device specific cryptographic keys in the personal device. In response to the transferred data package, a backup data package is received by the secure processing point from the personal device, which backup data package is the data package encrypted with a unique secret chip key stored in a tamper-resistant secret storage of a chip included in the personal device. The secure processing point retrieves a unique chip identifier from the chip and associates the identifier with the backup data package, after which the backup data package together with the associated unique chip identifier is stored in a permanent, global public database, e.g. connected to the Internet.

As previously explained in the background section, the cryptographic keys will typically be stored in some writable non-robust memory, e.g. a flash memory, of the device. If the information in this memory is lost or corrupted, its content needs to be restored using the backup data package. Using the invention there will be no need for maintaining any secret database storing keys to be used for decrypting backup data packages. Instead, the specific device, to which a backup data package is associated via the chip identifier, is able to decrypt a received backup data package using the unique secret chip key for the purpose of restoring the cryptographic keys.

Neither the device manufacturer nor any device administrator needs to maintain a secret database storing keys for decrypting backup data packages. In fact, it is preferred, for security reasons, not to store or distribute any copies of the unique secret chip key at chip manufacturing. This unique secret chip key never leaves the tamper-resistant storage. No other entity, including the device manufacturer, ever learns this key. Besides enabling improved security this also greatly simplifies key management.

By storing the backup data packages in a public database, key management is further simplified and made less costly. Moreover, this allows not only a device manufacturer but anyone in control of the device, such as a device owner or device administrator, to completely on its own restore the original cryptographic keys of a device.

The encryption and decryption of a backup data package within the device, using the non-distributed unique secret chip key stored in the device, provide protection and integrity of the backup data package content, both during transfer and storage in the public database. As is understood, the data package may include any kind of cryptographic keys for various purposes, e.g. keys relating to DRM (Digital Rights Management), SIM (Subscriber Identity Module) locking of a personal device implementing a wireless terminal, the provision of a secure, key based communication channel between the personal device and the device manufacturer etc. Furthermore, any other kind of secret, device specific information may also be included in the data package and, thus, be protected by the unique secret chip key in the same way as the cryptographic keys. Thus, the information included in the backup data package stored in the public database may relate to cryptographic keys as well as other secret, device specific data.

Advantageously, the backup data package includes one or more communication keys for a secure, key based communication between the device manufacturer and the device. This means that the establishment and recovery of such a secure communication channel will be protected and provided with integrity. That is, an external party will not be able to alter the communication key of the secure channel for the device so that the encryption/decryption of this secure channel determined during assembly is circumvented, for example if the device were to be stolen or re-distributed on another consumer market by a dishonest possessor of a device. This ensures a secure channel for communication between the manufacturer and the personal device, which communication can not be tampered with by any device owner or third party, both during the process of device assembly and after the personal device has been shipped to a customer.

Preferably, a certificate for the unique device identity associated with a specific device is stored in association with the corresponding backup data package. This has the advantage that the unique device identity may be verified, by means of a public signature verification key stored in a ROM memory of the device, as the authentic device identity during recovery of the personal device.

The one or more cryptographic keys in the data package advantageously include symmetric and/or public/private keys necessary for any subsequent secure communication between the device and its manufacturer, not excluding other cryptographic keys for other communication purposes, such as encryption key pairs and signature key pairs.

The keys in the data package are either provided to the secure processing point from an external source or generated by the secure processing point itself. This means that there is no deterministic generation within the device of the cryptographic keys to be used for communication with the manufacturer. This provides flexibility in deciding what implementation, with respect to type of cryptographic keys and algorithms, to choose for, e.g., the secure communication channel. Also, keys and algorithms for such a secure communication channel can be changed when necessary, without having to change the basic manufacturing/assembly process.

Furthermore, by minimizing, or completely avoiding, public key generation internally in the device, the computations within the device are minimized. This reduced overhead provides smaller delays and faster assembly of the device on the assembly line.

Thus, the present invention simplifies and reduces the overhead for both assigning device specific cryptographic keys to a personal device as well as managing these cryptographic keys after assembly and shipment of the device.

Further features and advantages of the invention will become more readily apparent from the following detailed description.

BRIEF DESCRIPTION OF THE DRAWINGS

Exemplifying embodiments of the present invention will be described in greater detail with reference to the accompanying drawings, in which the same features appearing in several drawings have been denoted with the same reference signs, and in which.

DETAILED DESCRIPTION OF PREFERRED EMBODIMENTS

Figure 1:
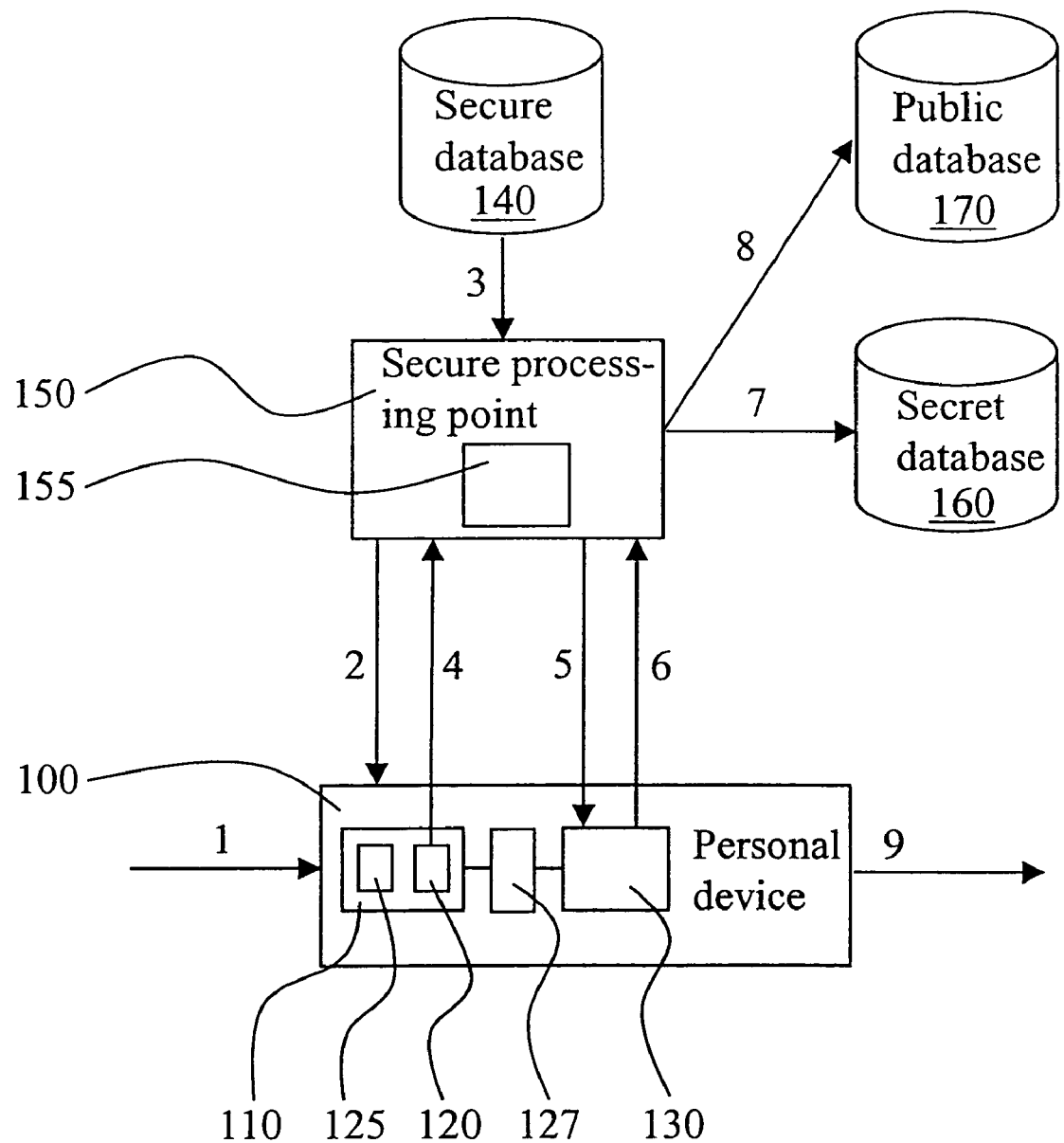
FIG. 1 schematically shows an exemplifying system which includes the elements and illustrates the operation of preferred embodiments of the invention.

With reference to FIG. 1 an exemplifying embodiment of the invention will now be described in greater detail. Shown in the figure is a personal device 100 subject to assembly at a device manufacturer. The manufacturer controls the assembly of the device by means of a secure processing point 150 which is arranged in communication with the device. The method and means for communicating with the device can be based on any technique that is known to the skilled person and that is suitable for the type of device in question. As will be appreciated by a person skilled in the art, the assembly of the device will initially include loading of various basic software modules in a memory of the device, such as I/O-drivers and a communication protocol to be used by interface circuitry of the device for implementing a communication port (not shown). Alternatively, such I/O-drivers may already be stored in a ROM memory (not shown) included by the device. The secure processing point 150 will include corresponding communications software that is compatible with the communication protocol used by the communication port of the device, thus facilitating communication between the secure processing point 150 and the personal device 100.

The implementation of the personal device 100 is based on a hardware platform that includes all kinds of circuitry needed for the personal device to be able to operate, such as memory circuitry, processing circuitry, interfacing circuitry etc. Of importance with respect to the invention, the device 100 includes an integrated chip 110, which chip includes a read-only storage area 120 and a tamper-resistant secret storage 125. The chip can be designed using any state of the art technique, subject to the condition that these two storage areas are provided within the chip. The device also includes a memory circuit 130, providing an ordinary non-secure memory, e.g. implemented by a flash memory, in which information may be written. Furthermore, the device includes means 127 for encrypting data which are received in a data package, i.e. a package defining a collection of data, from the secure processing point, using a unique secret chip key stored in the tamper-resistant secret storage 125. This means for encrypting a received data package is implemented by any suitable processing hardware means, such as a microprocessor or one or more application specific integrated circuits, executing program instructions which have been loaded into a memory of the device. This execution causes the processing hardware to perform symmetric encryption of the data in accordance with known techniques. Consequently, the design of these program instructions will be appreciated by a person skilled in the art of programming.

The secure processing point 150 includes processing means 155, e.g. by means of a general purpose computer implementation, for controlling the communication with the device and for performing certain activities with respect to a device. The processing means 155 also facilitates communication with various databases 140, 160 and 170, to which the secure processing point 150 is operatively connected. The processing means 155 controls the secure processing point 150 to operate in accordance with the present invention by executing suitable program instructions. The design of these program instructions will be appreciated by a person skilled in the art of programming after having studied the description of the operation of the invention as set forth below.

A temporary secure database 140 is provided as storage for unique device identities that are used in a first embodiment of the invention. The type of identities stored depend on the type of devices subject to assembly. If the devices are wireless communications terminals to be used in a wireless communications network, for example as Mobile Stations in a GSM network (Global System for Mobile communications) or as User Equipments in a UMTS network (Universal Mobile Telecommunications System), the unique device identities will correspond to International Mobile Equipment Identities (IMEIs). The secure database 140 may also be provided as storage for symmetric keys or private/public key pairs that have been derived in advance, i.e. before assembly of the devices in which the symmetric keys or private/public key pairs are to be stored by means of data packages. As stated, the database 140 is temporary. After information has been retrieved from this database with respect to a device, this information is deleted from the database.

The system shown in FIG. 1 also includes a permanent public database 170 for storing backup data packages received from the secure processing point, which backup data packages constitute data packages encrypted by respective devices. Furthermore, the system may also include an optional secret database 160, which belong to the manufacturer and in which the manufacturer may store certain device specific data of the devices that have been assembled.

Referring again to FIG. 1, an exemplifying mode of operation of the system and its included embodiment of the invention will now be described. The description particularly emphasizes the activities performed for managing cryptographic keys in accordance with the described embodiment, which activities will be described in a step by step fashion. To illustrate the element interactions and data flow involved in the various steps, arrows having numbers corresponding to the steps have been included in the figure.

Initially, in step 1, and as indicated with arrow 1, the device manufacturer receives the hardware on which the personal device is to be based from a factory producing such hardware. As explained above, the hardware includes the integrated chip 110, with its read-only storage area 120 and tamper-resistant secret storage 125, and the memory circuit 130. The assembly of the device starts in step 2 by downloading various basic executable software modules in the device from the secure processing point 150, as indicated with arrow 2. Alternatively, or in addition, some basic software modules may already be stored in a ROM memory included by the device. In particular, program instructions for controlling the processing means 127 of the device to operate so as to implement the means for encrypting a data package are stored in the memory circuit 130. The stored instructions also includes instructions for decrypting a received backup data package.

In step 3, a unique device identity may be retrieved by the secure processing point 150 from the database 140 storing a number of unique device identities. As a further option, this step may also include retrieving a symmetric key or one or more private/public key pairs that have been generated or computed in advance.

In step 4 the secure processing point 150 retrieves a unique chip identifier from the read-only storage area 120 of the integrated chip 110 included by the device 100 currently being subject to assembly. The secure processing point then assembles a data package which is to be stored in the device 100 in question. This data package should include at least one cryptographic key in order to enable, e.g., future secure, key based communication between the personal device 100 and the personal device manufacturer over a, for the purpose, suitably established communication channel between the same.

The at least one cryptographic key which, e.g., is associated with the future secure communication channel may either be a symmetric key or a public/private key pair. As previously described, the key or key pair may either be provided from an external source, implemented by the secure database 140, or optionally be generated by the secure processing point itself.

If a symmetric key is used, the secure processing point may generate this key as a function of one single secret master key and the unique device identity. By deriving the symmetric keys from the respective unique device identities, it will not be necessary to store all symmetric keys for all devices in a secret database, neither during the assembly process nor afterwards when the symmetric keys are to be used during communication with an assembled device over the secure communication channel. The only key that needs to be secretly stored is the master key common for all symmetric keys.

If a public/private key pair is used the generation of this pair outside of the device will, as previously described, speed up the assembly process. Any generation of the key pair in the secure processing point will be performed in accordance with known techniques. If this key pair, and a certificate for the public key of the key pair, are computed in advance and provided by an external source, implemented as secure database 140, the speed of the device assembly will be even faster. As will be clear to a person skilled in the art, the private key and the public key for the certificate is stored in a device by incorporating them in a data package. The public key corresponding to the private key and its certificate can then be stored in a database, such as database 170, without taking any particular security measures. After these storage operations the generated key and certificate information can be removed from the database 140. In this way the necessity of any on-line secret database for the public/private key pair will be avoided. In comparison with using a symmetric key generated by the secure processing point, the use of a key pair will avoid the necessity to secretly store a master key from which the symmetric keys are derived.

In step 5 the data package, which includes at least a symmetric key or a public/private key pair, is subject to encryption by the device and loaded in the memory circuit 130 of the device 100. Upon reception of the data package, the processing means 127 of the device will use the unique secret chip key from the secret storage 125 for encrypting, a part of or the full content of, the received data package. The encryption is performed by execution of appropriate program instructions, designed in accordance with known techniques, which previously have been loaded in the device (in step 2).

In step 6 the secure processing point receives a backup data package from the device, which backup data package is equal to the data package content that has been encrypted with the unique secret chip key of the device. The secure processing point may now add a backup code to the backup data package in order for the device to in the future, upon reception, be able to distinguish the backup data package from an ordinary data package. Alternatively, such code can be added to the backup data package by the device itself. Of course, other ways of implementing this distinguishing mechanism will be appreciated by the skilled person. The secure processing point associates the unique chip identifier, retrieved in step 4, with the received backup data package.

According to an embodiment of the invention, each device has a corresponding unique device identity. Furthermore, this unique device identity should be stored in the device together with a certificate for the unique device identity. As described above, the secure processing point 150 will in this case retrieve (in step 3) a unique device identity from the secure database 140. Furthermore, step 4 above will include associating the retrieved unique device identity with the retrieved unique chip identifier, e.g. by performing a concatenation of the two. Then the result of the concatenation is signed using a private signature key of the manufacturer. This private signature key corresponds to a public signature key of the manufacturer which public key has been stored in a read-only memory of the device, e.g. in step 2 above. The resulting certificate for the unique device identity is stored in the flash memory of the device in step 5 above. In step 6 the association of the unique chip identifier with the received backup data package also includes the association of the unique device identity and its generated certificate.

In step 7 various device specific data may be stored in an database 160 administrated by the manufacturer. The security level of this database 160 depends on the kind of data stored therein. Typically, the data included therein are data that are used when offering various services to a third party with respect to the device, which data only requires a moderate level of security. However, this database will constitute an on-line secret database with high security in those cases such a high security database is required, e.g. for storing symmetric keys or a master secret key for the generation of symmetric keys.

In step 8 the backup data package and the associated unique chip identifier, and any associated unique device identity together with a certificate for the same, are stored by the secure processing point 150 in the permanent public database 170. This database is accessible to third parties, e.g. over the Internet. Thus, after a device has been assembled and shipped, a third party may, using e.g. the unique chip identifier of a device, retrieve the backup data package of the device. Since the backup data package is used to restore specific data that have been associated with the device, the backup data package will not be useful to a third party which is not the rightful possessor of the device. It should be noted that the public key of the public/private key pair associated with the secure communication channel could be stored in the public database so as to be accessible to a third party. In this case the secure communication channel will not only be a channel between the device and the manufacturer, but between any party and the device.

After step 8 in the assembly process the device is ready for shipment, the shipment being illustrated by arrow 9.

Figure 2:
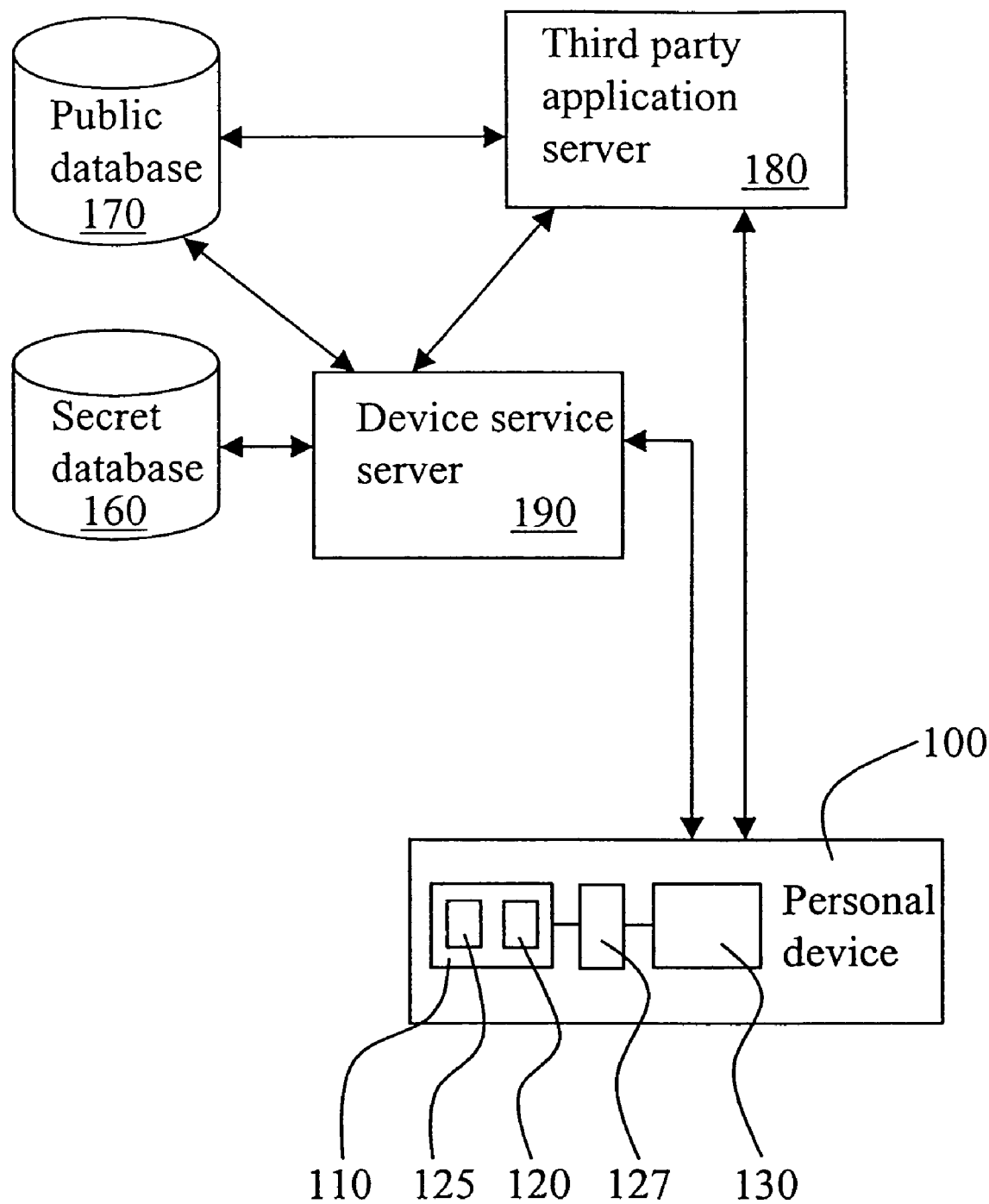
FIG. 2 schematically illustrates some possible device management activities that can be performed after shipment of the device assembled in FIG. 1.

With reference to FIG. 2 some examples of possible device management activities are described that can be performed with respect to the assembled device after its shipment.

FIG. 2 includes the databases 160 and 170 previously described with reference to FIG. 1. Database 170 is the public database storing backup data packages and database 160 is the optional secret database storing various device specific secret data. The device 100 corresponds to the device assembled in FIG. 1 after shipment, now in control by its owner. The figure also shows a third party application server 180, operatively connected to the public database 170, and a device service server 190 operated by the device manufacturer and operatively connected to the database 160 and 170 with device specific data.

Now, assume that the memory circuit 130 of the device for some reason looses its content. This implies that all cryptographic keys that were stored in the device during assembly will be lost. Via a third party application server which interacts with the public database 170 over, e.g. the Internet, the owner of the personal device will then be able to restore some of the lost data in the flash memory without any interaction with a service point and/or a secret database.

The recovery of the essential flash memory data is achieved by first reading the unique chip identifier from the read-only storage 120 of the personal device 100. The chip identifier is then sent to an on-line system incorporating the public database 170. The on-line system returns the corresponding backup data package and certificate for the unique device identity, without having to access any secret information. The owner is then able to create a new flash image using the received copy of the backup data package and the certificate. When the device 100 then is booted up, the device will recognize the backup code attached to the received backup data package and start to decrypt the backup data package to a data package which is identical to the data package originally stored in the flash memory during assembly of the device by the manufacturer. Moreover, the recovery of the flash content also includes recovery of the unique device identity that has been allocated to the device. It should not be possible for anyone to change this device identity during a recovery, but it should be the same as that originally stored by the manufacturer. To ensure this, the device uses the manufacturer's public signature key stored in the ROM memory of the device to verify the certificate and verify the authenticity of the device identity. This operation is thus performed without any interaction from the manufacturer. If this verification is successful, the cryptographic keys and the unique device identity, and possibly some other data, which were associated with device during its assembly by the manufacturer, will be fully restored in the memory circuit 130.

If an owner of the device requests a service from the manufacturer, e.g. the downloading of new software modules, the owner accesses the device service server 190 provided by the manufacturer. The access includes transfer of the unique device identity of the device to the server. The manufacturer's server 190 then retrieves or generates the appropriate cryptographic key corresponding to the received device identity and to be used for the secure communication with the device. Thus, such key may be a symmetric key retrieved from the database 160, a symmetric key generated from the device identity and the master secret key, or a or a public key extracted from a certificate retrieved from database 170 with a corresponding private key stored in the device. The applicable cryptographic key is then used for encrypting the manufacturer's communication with device using any appropriate operative connection. Typically this is performed remotely, such as using a long distance connection, the Internet, a wireless connection etc, whichever is appropriate and supported by the interface circuitry of the personal device. Thus, by means of the secure communication channel with the personal device, the manufacturer may provide various services with respect to device, services that include downloading of software modules, downloading of configuration data etc.

The invention claimed is:

1. A method comprising:
retrieving in a secure processing point separated from and arranged in communication with a personal device, a unique chip identifier from a read-only storage of an integrated circuit chip included in the personal device;
the secure processing point assembling a data package and loading the data package in the personal device for storage therein, the data package including at least one cryptographic key specific to the personal device;
receiving at the secure processing point, in response to storing the data package, a backup data package from the personal device, which backup data package is the data package encrypted with a unique secret chip key stored in a tamper-resistant secret storage of the integrated circuit chip included in the personal device;
associating the unique chip identifier with the received backup data package; and
storing the backup data package and the associated unique chip identifier in a permanent public database separated from the personal device;
wherein the secure processing point further performs:
associating a unique device identity with the unique chip identifier;
signing the associated unique device identity and unique chip identifier using a manufacturer private signature key corresponding to a manufacturer public signature key stored in a read-only memory of the personal device, thereby generating a certificate for the unique device identity;
storing the certificate in the personal device; and
storing in the permanent public database, the unique device identity and the certificate in association with the backup data package and the associated unique chip identifier.

2. The method as claimed in claim 1, wherein the at least one cryptographic key includes at least one cryptographic key to be used for a secure, key based communication channel between a personal device manufacturer and the personal device.

3. The method as claimed in claim 2, wherein the at least one cryptographic key to be used for a secure, key based communication channel includes a symmetric key.

4. The method as claimed in claim 3, wherein the symmetric key is generated as a function of a master key and the unique device identity.

5. The method as claimed in claim 2, wherein the at least one cryptographic key to be used for a secure, key based communication channel includes a private/public key pair.

6. The method as claimed in claim 5, wherein the private/public key pair either is:
generated by the secure processing point during assembly of the personal device; or
generated and stored in advance in a secure database before assembly of the personal device, in which latter case the cryptographic keys stored in advance of assembly are removed from the secure database after reception of the backup data package.

7. The method as claimed in claim 1, wherein the personal device is a wireless communications terminal and the unique device identity is an identifier which identifies the wireless communications terminal in a wireless communications network.

8. A system comprising:
at least one personal device, and
a secure processing point, which secure processing point is separated from and arranged in communication with the personal device,
wherein the at least one personal device includes an integrated circuit chip with a unique chip identifier in a read-only storage and a unique secret chip key in a tamper-resistant secret storage;
wherein the secure processing point includes a processor configured for retrieving the unique chip identifier and for assembling a data package and loading the data package in the personal device for storage therein, the data package including at least one cryptographic key specific to said personal device;
wherein the at least one personal device includes a processor configured for encrypting the received data package with the unique secret chip key and transferring a resulting backup data package back to the secure processing point; and
wherein the processor of the secure processing point is arranged for storing the received backup data package in association with the unique chip identifier in a permanent public database separated from the personal device;
wherein the processor of the secure processing point further is arranged for:
associating a unique device identity with the unique chip identifier;
signing the associated unique device identity and unique chip identifier using a manufacturer private signature key corresponding to a manufacturer public signature key stored in a read-only memory of the personal device, thereby generating a certificate for the unique device identity;
storing the certificate in the personal device; and
storing in the permanent public database, the unique device identity and the certificate in association with the backup data package and the associated unique chip identifier.

9. The system as claimed in claim 8, wherein the at least one cryptographic key includes at least cryptographic one key to be used for a secure, key based communication channel between a personal device manufacturer and the personal device.

10. The system as claimed in claim 9, wherein the at least one cryptographic key to be used for a secure, key based communication channel includes a symmetric key.

11. The system as claimed in claim 10, wherein the symmetric key is generated as a function of a master key and the unique device identity.

12. The system as claimed in claim 9, wherein the at least cryptographic one key to be used for a secure, key based communication channel includes a private/public key pair.

13. The system as claimed in claim 12, wherein the processor of the secure processing point either is:
arranged for generating the private/public key pair during assembly of the personal device; or
arranged for retrieving the private/public key pair from a secure database, in which the key pair has been stored in advance before assembly of the personal device, in which latter case the secure processing point further is arranged for removing the key pair from the secure database after reception of the backup data package.

14. The system as claimed in claim 8, wherein the personal device is a wireless communications terminal and the unique device identity an identifier which identifies the wireless communications terminal in a wireless communications network.

15. The method of claim 1, further comprising:
reading said unique chip identifier from said read-only storage of said personal device;
transmitting the chip identifier to said permanent public database;
receiving from the permanent public database said backup data package, said backup data package corresponding to the transmitted chip identifier; and
storing the received backup data package in the personal device.

16. A personal device comprising:
an integrated circuit chip with a unique chip identifier in a read-only storage and a unique secret chip key in a tamper-resistant secret storage;
a processor configured for outputting the unique chip identifier; and
a memory for storing a received data package from a secure processing point including at least one cryptographic key;
wherein the processor is further configured for encrypting the received data package from the secure processing point with the unique secret chip key and outputting a resulting backup data package to a permanent public database separated from said personal device;
the personal device further comprising:
a read-only memory storing a manufacturer public signature key, wherein the memory for storing the received data package is further for storing a received certificate of a unique device identity, said certificate being the signing of an association of the unique device identity and the unique chip identifier using a manufacturer private signature key corresponding to the manufacturer public signature key, said certificate corresponding to a certificate stored in association with the backup data package in the permanent public database and which has been signed with the manufacturer private signature key corresponding to the manufacturer public signature key.

17. The personal device as claimed in claim 16, wherein the at least one cryptographic key includes at least one cryptographic key to be used for a secure, key based communication channel between a personal device manufacturer and the personal device.

18. The personal device as claimed in claim 17, wherein the at least one cryptographic key to be used for a secure, key based communication channel includes a symmetric key.

19. The personal device as claimed in claim 18, wherein the symmetric key is generated as a function of a master key and a unique device identity.

20. The personal device as claimed in claim 17, wherein the at least one cryptographic key to be used for a secure, key based communication channel includes a private/public key pair.

21. The personal device as claimed in claim 16, wherein the personal device is a wireless communications terminal and a unique device identity is an identifier which identifies the wireless communications terminal in a wireless communications network.

22. A secure processing point comprising:
a processor configured for:
retrieving a unique chip identifier from a read-only memory of an integrated circuit chip included in a personal device that is separated from said secure processing point;
assembling a data package and loading the data package in the personal device for storage therein, the data package including at least one cryptographic key specific to the personal device;
receiving an encrypted version of the data package, in the form of a backup data package, from the personal device in response to the stored data package;
storing the received backup data package in association with the unique chip identifier in a permanent public database separated from the personal device;
associating a unique device identity with the unique chip identifier;
signing the associated unique device identity and unique chip identifier using a manufacturer private signature key corresponding to a manufacturer public signature key stored in said read-only memory of the personal device, thereby generating a certificate for the unique device identity;
storing the certificate in the personal device; and
storing in the permanent public database, the unique device identity and the certificate in association with the backup data package and the unique chip identifier.

* * * * *